Patented Sept. 19, 1922.

1,429,338

UNITED STATES PATENT OFFICE.

CHARLES F. GLASS, OF BROOKLYN, NEW YORK, ASSIGNOR TO FINGERPRINT MACHINE CORPORATION, A CORPORATION OF NEW YORK.

FINGER-PRINT COMPOSITION.

No Drawing. Application filed October 23, 1920. Serial No. 419,013.

*To all whom it may concern:*

Be it known that I, CHARLES F. GLASS, a citizen of the United States of America, residing at Brooklyn, county of Kings, and State of New York, have invented new and useful Improvements in Finger-Print Composition, of which the following is a specification.

This invention relates to compositions for use in recording finger prints.

The composition of the present invention is especially adapted for use in the method of recording finger prints set forth in my application for patent Serial Number 320,593, filed August 29th, 1919, that is in a method wherein the finger is impressed on a sheet, a pigment composition applied to the impressed surface, surplus pigment removed and the composition adhering to the finger lines is subjected to heat whereby it is softened whereupon it sinks into the sheet and becomes incorporated therewith so as to be indelible.

One object of the invention is to provide a pigment which shall securely adhere to the finger lines.

A further object of the invention is to provide a pigment composition for making finger print records which shall not be pasty or smudgy.

A further object of the invention is to provide a finger print composition which in its normal dry condition shall be freely flowing so that surplus material may be readily removed from the sheet.

A further object of the invention is to provide a composition for the use specified which shall have sufficient weight so as to flow readily under the action of gravity.

Other and ancillary objects of the invention will appear hereinafter.

The following composition illustrates the invention:

Asphaltum ____ 6 parts by volume.
Wheat flour ___ 4 parts by volume.
Talc powder ___ ¼ part by volume.
Silicon _____ ⅛ part by volume.

The whole in the form of a powder and thoroughly mixed.

In the use of the composition the finger is first impressed upon the sheet thereby creating lines of moisture thereon (and it is to be understood that the word moisture as used herein refers to any wetting by oil; natural secretions from the finger or otherwise). The composition is then applied, the surplus removed and the powdered surface subjected to heat to fix it.

The asphaltum is the pigment while the wheat flour acts as a binder to secure the pigment particles to the finger lines impressed on the paper when subjected to the moist finger lines, the wheat flour then, in conjunction with the moisture forming a paste by which the asphaltum particles are stuck fast. This only occurs, however, as to those particles upon the finger lines because the other particles have not come in contact with the moist lines. As to the latter particles therefor, they are easily slid off by tilting the sheet or blowing them off while the particles on the lines are securely held. Because of this sticking or binding function, the wheat flour may be referred to as a binder. The asphaltum and also the wheat flour may have a tendency to cohere and the powder become caked under some circumstances. In order to maintain the powder granular and freely flowing, a decohering substance such as the talc powder is added and the specific gravity of the composition may be increased so as to move readily under gravity, as when the sheet is tilted, by the use of silicon in the composition. In some instances the pigment may stick to the finger lines sufficiently without a binder. The binder may then be omitted. Also, if there is no tendency of the powder to cake, the decoherer may be omitted and the material, such as the silicon for increasing the specific gravity may be omitted when the powder flows sufficiently freely without it. The result is a composition which reliably and accurately defines the finger lines, is readily fixed upon the sheet and does not blur.

As stated above, the composition is in the form of a powder so that its ingredients including the silicon are in powdered form.

Although I have given above the reasons for the action of the composition as I understand them, I do not desire to limit myself to any particular theory of operation.

While the invention has been illustrated by what is considered its best embodiment, the precise proportions and ingredients specified may be varied without departing from its spirit. It is not therefore limited to the precise ingredients or proportions specified.

What I claim is:

1. A composition for recording finger prints comprising a pigment and a binder in powdered form, the said binder adapted to become adhesive on contacting with the moisture of the finger print lines.

2. A composition for recording finger prints comprising a pigment, a binder and a decoherer.

3. A composition for recording finger prints comprising a pigment, a binder, a decoherer and an ingredient of greater specific gravity than the other ingredients.

4. A composition for recording finger prints comprising a pigment and a decoherer.

5. A composition for recording finger prints comprising asphaltum and wheat flour.

6. A composition for recording finger prints comprising asphaltum, wheat flour and talc.

7. A composition for recording finger prints comprising asphaltum, wheat flour, talc and silicon.

8. A composition for recording finger prints comprising asphaltum 6 parts by volume, wheat flour 4 parts by volume, talc powder ¼ part by volume and silicon ⅛ part by volume.

In testimony whereof I have signed this specification this 29th day of September, 1920.

CHARLES F. GLASS.